Patented Oct. 14, 1924.

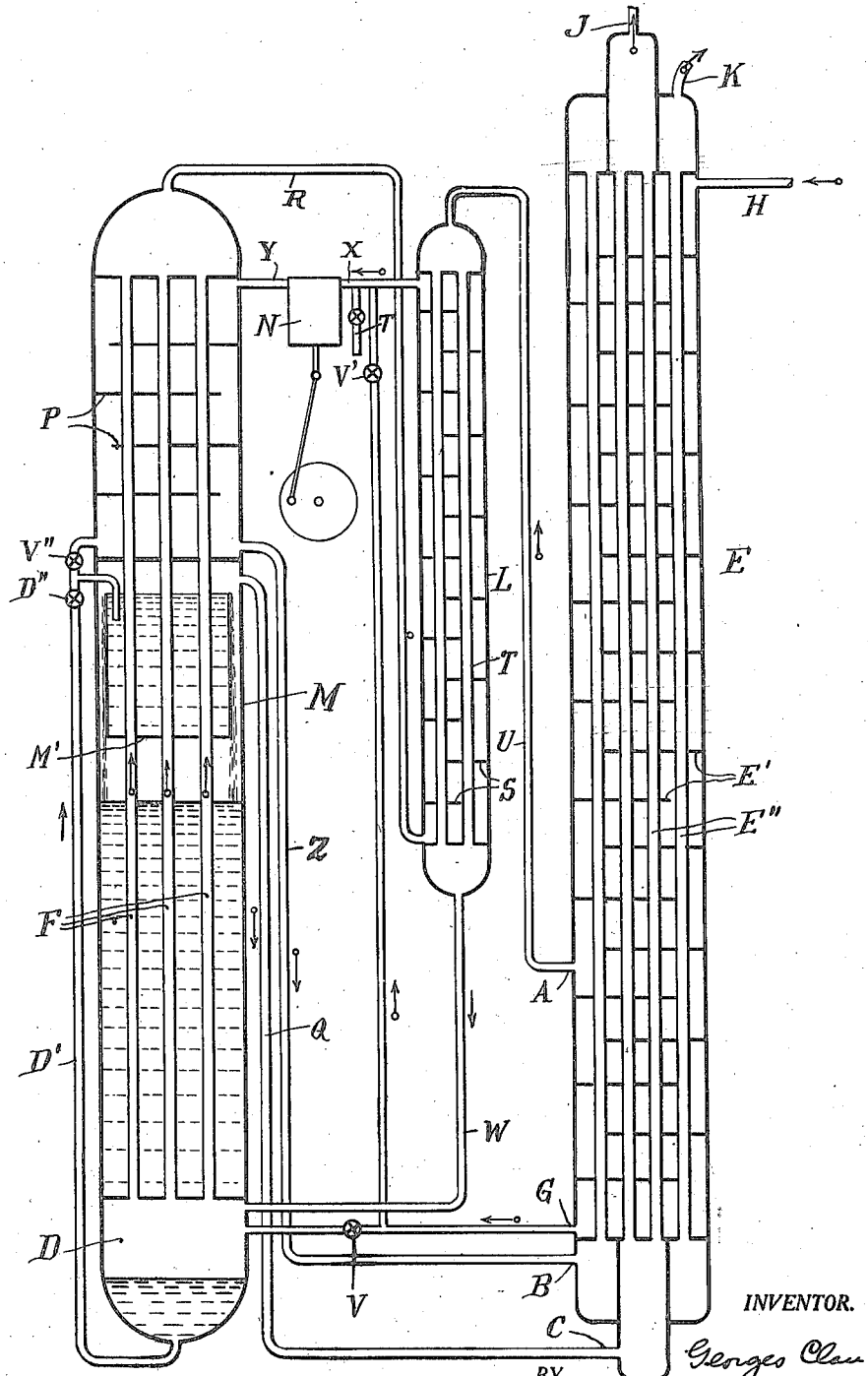

1,511,800

UNITED STATES PATENT OFFICE.

GEORGES CLAUDE, OF PARIS, FRANCE, ASSIGNOR TO SOCIETE L'AIR LIQUIDE (SOCIETE ANONYME POUR L'ETUDE ET L'EXPLOITATION DES PROCEDES GEORGES CLAUDE), OF PARIS, FRANCE.

MANUFACTURE OF HYDROGEN BY PARTIAL LIQUEFACTION OF GASEOUS MIXTURES.

Application filed February 9, 1922. Serial No. 535,191.

*To all whom it may concern:*

Be it known that I, GEORGES CLAUDE, a citizen of France, residing at Paris, in the Republic of France, have invented certain new and useful Improvements in the Manufacture of Hydrogen by Partial Liquefaction of Gaseous Mixtures; and I do hereby declare the following to be a full, clear, and exact description of the invention, such as will enable others skilled in the art to which it appertains to make and use the same.

This invention relates to a process and apparatus for the separation of gaseous mixtures, and particularly to the recovery of hydrogen by partial liquefaction of preliminarily purified mixtures containing the same, such as water gas, ordinary illuminating gas as used for town lighting, coke oven gas and similar gases, in which the source of cold, compensating for losses in the system, is supplied by the expansion with external work of the compressed hydrogen after it has been subjected to the lowest temperature of the cycle, as described more especially in French Letters Patent No. 329,839 of the 28th February, 1903, United States Letters Patent No. 1,212,455, and the specification of the copending application Serial No. 527,542.

In the process and apparatus described in the specifications of the patents referred to above, it is essential to comply with two conditions:—(1) to ensure the maintenance of the necessary quantity of liquid while using an initial pressure which is as low as possible, and (2) to obtain a very high degree of purity in the hydrogen by subjecting it to a very low temperature and to the total pressure.

The first condition asumes that the expansion with external work is as efficacious as possible, and to ensure this it is necessary, as has been explained in the patent specifications hereinbefore referred to, to carry out this expansion at the highest temperature compatible with the temperature conditions of the gas after expansion necessitated by the degree of purity it is desired to obtain, more especially as, in default of this step, all of the other gases would be solidified by the very low temperature of the hydrogen. With this object in view, and in accordance with the method of working described in the prior specifications mentioned, the compressed hydrogen is heated, before sending it into the expander, by passing it through a liquefier, through which is circulated in the reverse direction a part of the gases to be treated after their exit from the cold end of the temperature exchanger, these gases being afterwards returned to the liquid collector of the separating column. It is, moreover, desirable for these gases to arrive at the liquefier from the temperature exchanger as warm a spossible, and this presupposes that the expanded hydrogen and the carbon-monoxide, or carbon-monoxide, nitrogen and methane, before being sent to the temperature exchanger are themselves also previously heated by other parts of the compressed gas treated in supplementary liquefiers, as set forth in particular in the specification of the copending application Serial No. 527,542.

These supplementary liquefiers, however, form a somewhat complicated group of apparatus, and their weight and additional losses of cold due thereto tend to minimize certain of their advantages.

A much simpler arrangement of apparatus, which forms one of the chief objects of the present invention ensures all the advantages of these multiple liquefiers, while retaining only that for the heating of the hydrogen prior to its expansion; the arrangement to be described permits of a considerable increase in the initial temperature of the expansion, this being brought about by considerably heating the compressed hydrogen prior to its expansion, and it also at the same time permits of a very considerable reduction in the temperature at which the gases enter the nest of tubes wherein they are subjected to treatment, as also an increase of the proportion of gas already liquefied in these entering gases.

According to the present invention the manufacture of hydrogen by partial liquefaction of mixtures of gases containing the same, such as water gas, ordinary illuminating gas, or coke oven gas and similar gases is effected by a process in which the fraction of the compressed gasses utilized for feeding the liquefaction, wherein the compressed hydrogen is heated prior to its expansion, is withdrawn from the temperature exchanger or exchangers at a point located at such a distance from the cold end of said exchanger or exchangers that the temperature attained by the hydrogen immediately before subjecting it to expansion accompanied by the production of external work is raised to the maximum degree compatible with the low temperature after expansion necessary to ensure purity of the hydrogen, and at the same time the temperature of the main portion of the gases to be treated admitted to the separating column is considerably lowered.

In order that the invention may be clearly understood and readily carried into effect, the same will now be described more fully with reference to the accompanying drawing which shows diagrammatically an arrangement of apparatus suitable for carrying out the present process.

As shown by the drawing, it is convenient to use only one temperature exchanger E, of the same type as those commonly employed in air liquefaction apparatus. The whole of the compressed gas to be treated circulates round the outside of the nest of tubes in the temperature exchanger E, the gas following the path desired round the tubes by means of suitable baffle plates E', whilst the separated gases, for example hydrogen and carbon-monoxide in the case of water gas, or hydrogen, carbon-monoxide and nitrogen, and methane in the case of coke oven gas, pass into the tubes from their several respective collectors in two or three separate fractions, as the case may be. Such an exchanger E having two compartments is shown diagrammatically in the accompanying drawing, this being assumed to be for use in the case of water gas, which enters the exchanger through the pipe H.

In the case of the present arrangement of apparatus, therefore, the fraction of the compressed gases to be treated which is intended for feeding the liquefier L (that serves as a heater for the compressed hydrogen) is drawn off not from the coldest end of the exchanger E, but at a certain distance from this cold end, namely at A.

The separated gases, hydrogen and carbon-monoxide, for instance, arrive directly from the separating column M at the inlets B and C into the exchanger E, without undergoing any previous heating in liquefiers. After passing through the tubes of the exchanger the separated gases pass off through the outlets J and K.

The gases drawn off at A, which feed the liquefier L, are clearly much less cold than those which reach the end G of the exchanger. A sufficient proportion of these compressed gases, which are cooled only to a small extent, is made to circulate in the liquefier L, whilst at the same time the valve V, through which the gases to be treated enter the nest of tubes F in the separating column M, is gradually adjusted to the extent necessary to allow sufficient heating of the compressed hydrogen which circulates in the other compartment of the liquefier L on its way to the expander N. This heating is measured, for example, by thermo-electric couples or by a differential couple. The result desired is thus attained without further difficulties; namely, while the heating of the compressed hydrogen prior to expansion is very great, the cooling of the remainder of the compressed gases which circulate in the exchanger right up to the cold end G, is also very great and very efficacious, as this fraction of the total quantity of gases treated circulates in the reverse direction to a quantity of very cold carbon-monoxide and hydrogen equal to the total output from the apparatus. Consequently these gases which leave the exchanger at G reach the collector D in a very cold state and partly liquefied, the result of which is to reduce the evaporation of the liquid at the exterior of the tubes F and facilitate the maintenance of the liquid in the separating column. Furthermore, it may be pointed out that the single liquefier L is specially suited for satisfactory working, as the fluids which circulate therein are all of them at the maximum pressure of the cycle.

The more important and novel features of the invention being understood from the foregoing description, we shall now describe the operation in more detail. The gaseous mixture under the required pressure is introduced to the exchanger E through the inlet H and circulates downwardly in a sinuous path about the baffles E', and the tubes E" being thereby cooled by indirect contact with the gaseous products passing upwardly through the tubes. The major portion of the gaseous mixture escapes partly liquefied from the exchanger at G and, under control of the valve V, is delivered to the collector D at the foot of the column M. Thence the gaseous mixture passes upwardly through the tubes F and is therein subjected to indirect contact with liquid accumulating in the column and in a collector M' which is supported above the principal body of the liquid. The liquid surrounding the tubes F is vaporized, and the gaseous mixture in the tubes is subjected to selective liquefaction with backward return of the liquid in contact with the incoming gaseous mixture, whereby the liquid formed is enriched in the less volatile constituent of the gaseous mixture. The liquid returns to the collector D and is thence delivered through a pipe D' controlled by a valve D" to the collector M" from which it overflows to the principal body of liquid in the column.

The unliquefied residue of the gaseous mixture continuing through the tubes F is subjected to the cold expanded gaseous product which circulates about the baffles P in the upper section of the column. This causes a further selective liquefaction of the gaseous residue, the liquid returning and commingling with the liquid produced in the lower sections of the tubes F and finally entering the collector D. The residual unliquefied gas is withdrawn through the pipe R and is conveyed thereby to the liquefier L wherein it circulates upwardly about the baffles S in indirect contact with a portion of the original gaseous mixture flowing downwardly through tubes T in the liquefier and supplied through a pipe N' from the outlet A of the exchanger E. This is the regulated portion of the original gaseous mixture partially cooled in the exchanger E, but not reduced to the temperature of that portion which escapes from the exchanger at G, and after passing through the tubes T, the liquid formed in the liquefier, together with any unliquefied gas, escapes through the pipe W to the collector D. The residual gas, after passing through the exchanger L, is delivered by a pipe X to the expander N where it expands with external work and is thereby cooled. The cold gaseous residue is delivered by a pipe Y to the upper section of the column where it circulates about the baffles P as hereinbefore described, escaping through a pipe Z to the inlet B of the exchanger E. The vapor formed in the lower compartment of the column escapes through a pipe Q to the inlet C of the exchanger and the separated gaseous products, after passing through the tubes E'' of the exchanger, escape at J and K respectively.

The initial filling of the apparatus is effected, for example, by passing the gases to be treated into the expander N by way of the valve V' which is closed when the column is in operation, the portions liquefied by the action of the expansion toward its end passing into the upper part of the separating column and thence by way of the valve V'', also normally closed, into the lower part of the said column, the method being similar in its general features to that described in the specification of our co-pending application, Serial No. 527,542.

Under the conditions heretofore indicated, however, the part played by the very cold expanded hydrogen, for the final purification of the compressed hydrogen in the ascendant nest of tubes in the separating column M is somewhat limited. As a matter of fact, the calorific capacity of the hydrogen of these two opposed currents is the same, and the calorific capacity of the hydrogen in a compressed state increases by the whole of that of the impurities to be liquefied.

The compressed hydrogen, after leaving the tubes through which it circulates in counter current to the expanded hydrogen circulating outside the said tubes, cannot, therefore, attain as low a temperature as the expanded hydrogen, whence the necessity arises of arranging matters so that the hydrogen, as a result of its expansion, attains a temperature which is as low as possible. This, however, as is well known, leads to difficulties owing to the possible solidification of the remaining impurities and the lubricants that it may be necessary to employ.

In accordance with the present invention, this difficulty is overcome, when the presence of nitrogen is not prejudicial, by adding through a pipe T to the compressed hydrogen, just when it is about to expand, a suitable proportion of dry cold nitrogen which mixes with this hydrogen and expands with it, and becomes liquefied at the end of the expansion.

The calorific capacity of the expanded hydrogen is thus increased by the whole of that of the nitrogen, (which is partly liquid) carried along with it, and the current of expanded hydrogen is thus able to bring the counter current of compressed hydrogen to be purified to a lower temperature, starting from one and the same final temperature of expansion.

Furthermore, the liquid nitrogen thus formed plays an important part as a lubricant in connection with the working of the expander. There may also, if desired, be added to the nitrogen hydrocarbons which do not solidify under the temperature conditions obtaining in the expander.

While the invention has been described with reference particularly to the separation of hydrogen and its recovery from gaseous mixtures, the fundamental principles of the method and apparatus may be applied with beneficial results to the separation of gaseous mixtures other than those mentioned.

Moreover, as will be apparent from the foregoing description, various changes may be made in the details of the method and apparatus without departing from the invention or sacrificing any of the several advantages thereof.

I claim:

1. A process for the manufacture of hydrogen by partial liquefaction of mixtures of gases containing the same, such as water gas, ordinary illuminating gas, or coke oven gas, in which the fraction of the compressed gases utilized for feeding the liquefier, wherein the compressed hydrogen is heated prior to its expansion with production of external work, is withdrawn from the temperature exchanger or exchangers at a point located at such a distance from the cold end of said exchanger or exchangers that the temperature attained by the hydrogen immediately before subjecting it to expansion is raised to the maximum degree compatible with the low temperature after expansion necessary to ensure purity of the hydrogen, and the cold hydrogen after expansion is circulated in heat-exchanging relation with the residual gas resulting from partial liquefaction of the gaseous mixture to ensure maximum separation of impurities from the hydrogen in the residual gas.

2. A process for the manufacture of hydrogen by partial liquefaction of mixtures of gases containing the same, such as water gas, ordinary illuminating gas, or coke oven gas, in which the fraction of the compressed gases utilized for feeding the liquefier wherein the compressed hydrogen is heated prior to its expansion with the production of external work is withdrawn from the temperature exchanger or exchangers at a point located at such a distance from the cold end of said exchanger or exchangers that the temperature attained by the hydrogen immediately before subjecting it to expansion is raised to the maximum degree compatible with the low temperature after expansion necessary to ensure purity of the hydrogen, while at the same time the temperature of the main portion of the gases admitted of the separating column is considerably lowered and a certain proportion of cold compressed nitrogen is added to the compressed hydrogen before the latter is expanded.

3. A process for the manufacture of hydrogen by partial liquefaction of mixtures of gases containing the same, such as water gas, ordinary illuminating gas, or coke oven gas, in which the fraction of the compressed gases utilized for feeding the liquefier wherein the compressed hydrogen is heated prior to its expansion with the production of external work is withdrawn from the temperature exchanger or exchangers at a point located at such a distance from the cold end of said exchanger or exchangers that the temperature attained by the hydrogen immediately before subjecting it to expansion is raised to the maximum degree compatible with the low temperature after expansion necessary to ensure purity of the hydrogen, while at the same time the temperature of the main portion of the gases admitted to the separating column is considerably lowered and a certain proportion of hydrocarbons which do not solidify under the temperature conditions obtaining in the expander are added with nitrogen to the hydrogen before expansion thereof.

4. A process of separating the constituents of gaseous mixtures such as those containing hydrogen, comprising initially cooling the compressed gaseous mixture by indirect contact with gaseous products of the separation, withdrawing part of the cold gaseous mixture, further cooling the remaining cold gaseous mixture by indirect contact with the cold gaseous products of the separation, subjecting the gaseous mixture to selective liquefaction and to a final purification cooling to produce a liquid and a residual gas, withdrawing and warming the residual gas by indirect contact with the above withdrawn part of the cold gaseous mixture, expanding the heated residual gas and utilizing this expanded residual gas first for the final purification cooling of the gaseous mixture and then with the other gaseous products of the separation for the cooling of the gaseous mixture.

5. A process of separating the constituents of gaseous mixtures such as those containing hydrogen, comprising initially cooling the compressed gaseous mixture by indirect contact with gaseous products of the separation, withdrawing part of the cold gaseous mixture, further cooling the remaining cold gaseous mixture till a partial liquefaction occurs by indirect contact with the cold gaseous products of the separation, subjecting the gaseous mixture to selective liquefaction and to a final purification cooling to produce a liquid and a residual gas, withdrawing and warming the residual gas, by indirect contact with the above withdrawn part of the cold gaseous mixture which becomes partly liquefied, expanding the heated residual gas and utilizing this expanded residual gas first for the final purification cooling of the gaseous mixture and then with the other gaseous products of the separation for the cooling of the gaseous mixture.

6. A process of separating the constituents of gaseous mixtures such as those containing hydrogen, comprising initially cooling the compressed gaseous mixture by indirect contact with gaseous products of the separation, withdrawing part of the cold gaseous mixture, further cooling the remaining coal gaseous mixture by indirect contact with the cold gaseous products of the separation, subjecting the gaseous mixture to selective liquefaction to produce a liquid and a residual gas, withdrawing and warming the residual gas by indirect contact with the above withdrawn part of the cold gaseous mixture, mixing another gas with the residual gas, expanding the mixed gas and utilizing the cold expanded mixed gas in the final cooling of the gaseous mixture before withdrawal of the residual gas to promote the separation of impurities therefrom.

7. A process of separating the constituents of gaseous mixtures such as those containing hydrogen, comprising initially cooling the compressed gaseous mixture by indirect contact with gaseous products of the separation, withdrawing part of the cold gaseous mixture, further cooling the remaining cold gaseous mixture by indirect contact with the cold gaseous products of the separation, subjecting the gaseous mixture to selective liquefaction to produce a liquid and a residual gas, withdrawing and warming the residual gas by indirect contact with the above withdrawn part of the cold gaseous mixture, mixing another gas and liquid hydrocarbon with the residual gas, expanding the mixed gas and utilizing the cold expanded mixed gas in the final cooling of the gaseous mixture before withdrawal of the residual gas to promote the separation of impurities therefrom.

8. In an apparatus for separating the constituents of gaseous mixtures such as those containing hydrogen, the combination of means for subjecting the mixture to selective liquefaction and to a final purification cooling to separate a liquid and a residual gas, means for initially cooling the gaseous mixture, means for withdrawing a portion of the gaseous mixture from said cooling means before it is subjected to the temperature at the colder end thereof, means for warming the residual gas by indirect contact with said portion of the gaseous mixture, and means for expanding the warmed residual gas and means for utilizing this expanded residual gas first for the final purification cooling of the gaseous mixture and then with the other gaseous products of the separation for the cooling of the gaseous mixture, the expanded residual gas in the final cooling of the gaseous mixture before withdrawal of the residual gas to promote the separation of impurities therefrom.

9. In an apparatus for separating the constituents of gaseous mixtures such as those containing hydrogen, the combination of means for subjecting the mixture to selective liquefaction to separate a liquid and a residual gas, means for initially cooling the gaseous mixture, means for withdrawing a portion of the gaseous mixture from said cooling means before it is subjected to the temperature at the colder end thereof, means for warming the residual gas by indirect contact with said portion of the gaseous mixture, means for mixing another gas with the warmed residual gas, and means for expanding the warmed residual gas, and means for utilizing the expanded residual gas in the final cooling of the gaseous mixture before withdrawal of the residual gas to promote the separation of impurities therefrom.

10. A process of separating the constituents of gaseous mixtures such as those containing hydrogen by circulating it in a laterally confined space in indirect contact with the gaseous products of the separation, withdrawing from the said space part of the cold gaseous mixture, further cooling the remaining cold gaseous mixture till partial liquefaction occurs by circulating it in the continuation of the laterally confined space in indirect contact with the cold gaseous products of the separation, withdrawing the resulting liquid and gaseous mixture towards the end of the said space, subjecting the residual gaseous mixture to selective liquefaction to produce liquid parts and a residual gas, warming the residual gas by indirect contact with the above withdrawn part of the cold gaseous mixture which becomes partly liquefied, expanding the heated residual gas and utilizing in the selective liquefaction the cold expanded gas and the liquid parts obtained.

11. A process of separating the constituents of gaseous mixtures such as those containing hydrogen, comprising initially cooling the compressed gaseous mixture by indirect contact with gaseous products of the separation, withdrawing part of the cold gaseous mixture, further cooling the remaining cold gaseous mixture by indirect contact with the cold gaseous products of the separation, subjecting the residual gaseous mixture to selective liquefaction to produce liquid parts and a residual gas, withdrawing and warming the residual gas by indirect contact with the above withdrawn part of the cold gaseous mixture, mixing another gas with the residual gas, expanding the mixed gas and utilizing the cold expanded mixed gas and the liquid parts obtained in the selective liquefaction of the gaseous mixture.

12. A process of separating the constituents of gaseous mixtures such as those containing hydrogen, comprising initialy cooling the compressed gaseous mixture by indirect contact with gaseous products of the separation, withdrawing part of the cold gaseous mixture, further cooling the remaining cold gaseous mixture by indirect contact with the cold gaseous products of the separation, subjecting the residual gaseous mixture to selective liquefaction to produce liquid parts and a residual gas by indirect contact with the above withdrawn part of the cold gaseous mixture, mixing nitrogen with the residual gas, expanding the mixed gas and utilizing the cold expanded mixed gas and the liquid parts obtained in the selective liquefaction of the gaseous mixture.

13. A process of separating the constituents of gaseous mixtures such as those containing hydrogen, comprising initially cooling the compressed gaseous mixture by indirect contact with gaseous products of the separation, withdrawing part of the cold gaseous mixture, further cooling the remaining cold gaseous mixture by indirect contact with the cold gaseous products of the separation, subjecting the residual gaseous mixture to selective liquefaction to produce liquid parts and a residual gas, withdrawing and warming the residual gas by indirect contact with the above withdrawn part of the cold gaseous mixture, mixing another gas and liquid hydrocarbon with the residual gas, expanding the mixed gas and utilizing the cold expanded mixed gas and the liquid parts obtained in the selective liquefaction of the gaseous mixture.

14. A process of working an expansion engine for low temperatures with a gas which does not liquefy under the conditions prevailing during the expansion such as hydrogen, which comprises adding to this gas a gas which liquefies under the conditions prevailing during the expansion such as nitrogen.

15. A process of working an expansion engine for low temperatures with a gas which does not liquefy under the conditions prevailing during the expansion such as hydrogen, which comprises adding to this gas a gas which liquefies under the conditions prevailing during the expansion such as nitrogen and avoiding lubricating matter for the piston cylinder of the expansion engine.

In testimony whereof I affix my signature.

GEORGES CLAUDE.